(12) United States Patent
Guthula et al.

(10) Patent No.: US 10,380,012 B2
(45) Date of Patent: Aug. 13, 2019

(54) BUFFER MAPPING SCHEME INVOLVING PRE-ALLOCATION OF MEMORY

(71) Applicant: Samsung Electronics Co., Ltd., Suwon-si, Gyeonggi-do (KR)

(72) Inventors: Manoj K Guthula, Los Altos, CA (US); Venkata Bhanu Prakash Gollapudi, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 182 days.

(21) Appl. No.: 15/333,010

(22) Filed: Oct. 24, 2016

(65) Prior Publication Data

US 2017/0308460 A1 Oct. 26, 2017

Related U.S. Application Data

(60) Provisional application No. 62/326,537, filed on Apr. 22, 2016.

(51) Int. Cl.
*G06F 12/02* (2006.01)
*G06F 12/1081* (2016.01)
*G06F 13/16* (2006.01)

(52) U.S. Cl.
CPC ........ *G06F 12/023* (2013.01); *G06F 12/1081* (2013.01); *G06F 13/1673* (2013.01); *G06F 2212/1044* (2013.01); *G06F 2212/656* (2013.01)

(58) Field of Classification Search
CPC ............... G06F 12/023; G06F 12/1081; G06F 13/1673; G06F 2212/1044; G06F 2212/656
See application file for complete search history.

(56) References Cited

U.S. PATENT DOCUMENTS

| | | | |
|---|---|---|---|
| 6,405,237 B1 | 6/2002 | Khalidi et al. | |
| 7,590,777 B2 | 9/2009 | Anglin et al. | |
| 8,166,194 B2 | 4/2012 | Omiya et al. | |
| 8,504,744 B2 | 8/2013 | Khawer et al. | |
| 8,868,867 B2 | 10/2014 | Swanson et al. | |
| 8,909,727 B2 | 12/2014 | Frey et al. | |
| 9,092,426 B1* | 7/2015 | Bathija | G06F 12/1081 |
| 2005/0273571 A1* | 12/2005 | Lyon | G06F 9/45537 711/203 |
| 2007/0255866 A1 | 11/2007 | Aloni et al. | |
| 2015/0095610 A1* | 4/2015 | Ben-Meir | G06F 12/1027 711/207 |

* cited by examiner

*Primary Examiner* — Henry Tsai
*Assistant Examiner* — John B Roche
(74) *Attorney, Agent, or Firm* — Innovation Counsel LLP

(57) ABSTRACT

The inventive concept pertains to a computer-implemented method by which an application, an operating system, and hardware communicate with one another. The method entails the application converting an application-level virtual address to a physical address and communicating the physical address to the operating system. The operating system then uses the physical address to determine OS-level virtual address and complete the data transfer.

10 Claims, 4 Drawing Sheets

BUFFER MAPPING SCHEME INVOLVING PRE-ALLOCATION OF MEMORY

CROSS-REFERENCE TO RELATED APPLICATION(S)

This application claims the benefit of U.S. Provisional Application No. 62/326,537 filed on Apr. 22, 2016, which is incorporated by reference herein.

BACKGROUND

The present disclosure relates generally to memory buffer, and more specifically to a buffer mapping scheme involving pre-allocation of memory.

In a UNIX-based storage/server system, there are various applications and device drivers, each performing a specific task. For the applications, the operating system (OS)/kernel, and the hardware to communicate effectively, they often pass around a memory buffer. Typically, during these communications, an application communicates its application-level virtual address to the operating system/kernel. The memory buffer calls the driver using the application-level virtual address, and the driver maps the application-level virtual address to the operating system/kernel-level virtual address.

To make this translation easier, virtual and physical memory are divided into handy sized chunks called pages. In this paged model, a virtual address is composed of an offset and a virtual page frame number. Every time the processor encounters a virtual address, the processor extracts the offset and the virtual page frame number from the virtual address. The processor then translates the virtual page frame number into a physical page frame number to access the location at the correct offset into that physical page. To translate a virtual address into a physical address, the processor first works out the virtual address page frame number and the offset within that virtual page. The processor uses the virtual page frame number as an index into the process page table to retrieve its page table entry. If the page table entry at that offset is valid, the processor takes the physical page frame number from this entry. The tables the processor uses to convert the virtual page frame number into a physical frame number are called page tables.

Virtual address is calculated by adding an offset to the virtual page number. To further enforce protection, there are separate page tables for a user space application and kernel. In order to access a user space virtual address, kernel level software maps the user space address to kernel address space. This process involves creating kernel page table entries for the user space address.

As for the hardware, the connection between the OS/kernel and the hardware occurs by way of direct memory access (DMA). By using DMA, a hardware device can transfer data from/to computer's main memory without involving CPU. For DMA to work, memory buffers are frequently mapped to an address range that is visible to the hardware device. This address range is called IO virtual address. Depending on the architecture, this may involve setting up translation between IO virtual address and physical address of computer main memory. Usually, this happens using IOMMU hardware. On some architectures, IO virtual address might be the same as the physical address of the computer main memory.

The above-described mapping scheme puts a heavy burden on the OS/kernel, which is required to first translate the application-level virtual address into OS-level virtual address by setting up page table entries. Similarly, DMA mapping should be established for every DMA transfer. A more efficient method for the OS, applications, and hardware to communicate is desired.

SUMMARY

In one aspect, the inventive concept pertains to a computer-implemented method by which an operating system communicates with an application. The method involves the operating system receiving a physical address directly from the application, and determining an OS-level virtual address based on the physical address of a memory.

In another aspect, the inventive concept pertains to a computer-implemented method by which an application, an operating system, and hardware in a single node communicate with one another. The method entails the application converting an application-level virtual address to a physical address and communicating the physical address to the operating system. The operating system then uses the physical address to determine OS-level virtual address.

In yet another aspect, the inventive concept pertains to an apparatus for controlling data transfer, the apparatus comprising a memory mapper that allows an application to convert its application-level virtual address to a physical address and communicate the physical address to an operating system.

DETAILED DESCRIPTION

The present system spares the OS from having to set up kernel level page table based translations every time memory buffer is passed. In the disclosure, the application communicates the physical address to the kernel. According to one embodiment, the kernel has the required mapping for this buffer. Hence, the kernel can calculate the virtual address and does not require performing mapping operation every time. Because all kernel modules share the same virtual address space, any OS module (not just the OS module that allocated the memory) can obtain the virtual address using the physical address and operate on the buffer.

Between different applications, communication happens using buffer offset. An application uses a virtual address to operate on the buffer. The application can calculate its own virtual address by simply adding the offset to the virtual address of the start of the buffer.

An application can determine the DMA address of an offset by simply adding the offset to DMA address at the start of the buffer. Applications can directly pass the buffer address to hardware device without kernel involvement.

While the disclosure is written in the context of a single node, this is not a limitation of the present disclosure.

Figure 1:
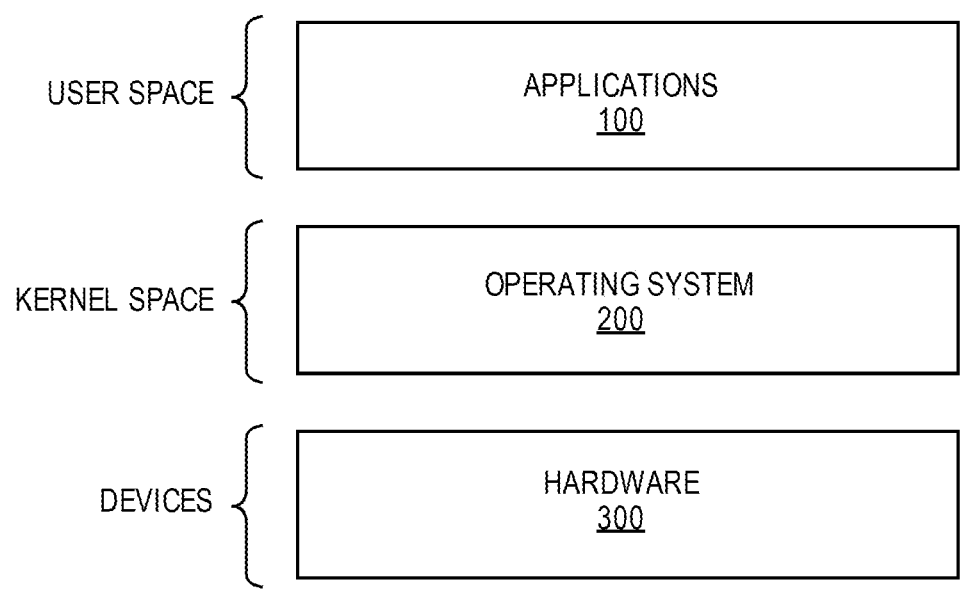
FIG. 1 is a conceptual illustration of the user space, kernel space, and hardware in a single node that provide one possible environment, according to one embodiment.

FIG. 1 is a conceptual illustration of the user space, kernel space, and hardware in a single node that provide one possible environment, according to one embodiment. As shown, applications 100 that form the user space, an operating system (OS)/kernel 200, and hardware 300 communicate with one another to receive and execute user requests. The hardware 300 includes various devices, the central processing unit, and system memory. The operating system 200 interfaces between the user space and hardware 300, and allows applications 100 to access the system memory, among other things. Device drivers are usually part of the OS 200. A memory mapper maps image and data files into applications in the user space. In memory mapping, the contents of a file are linked to the virtual address.

Figure 2A:
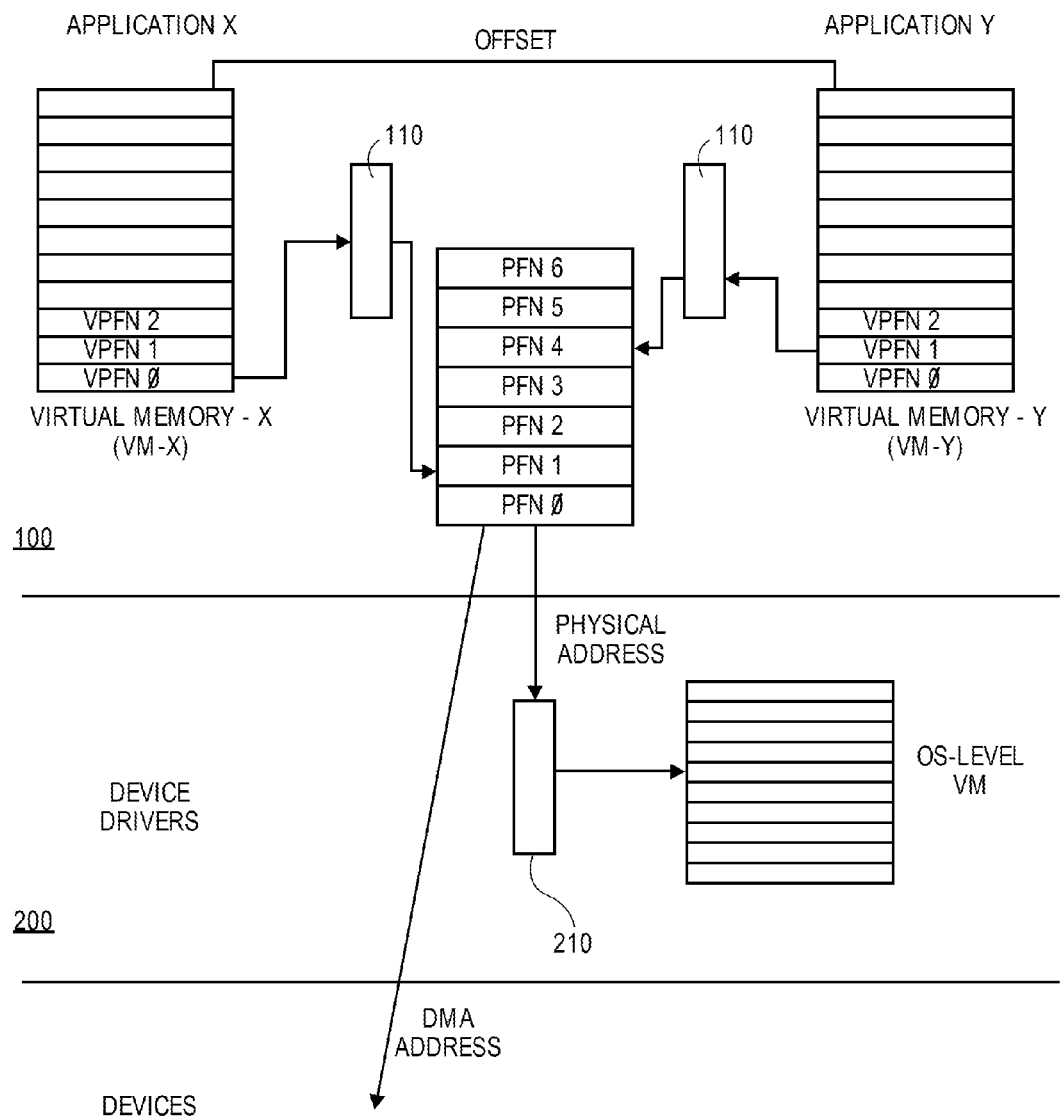
FIG. 2A is a schematic diagram showing communication between applications, an operating system, and hardware, according to one embodiment.

FIG. 2A is a schematic diagram showing communication between applications, an operating system, and hardware, according to one embodiment. Regarding applications 100, two applications, application X and application Y are shown. Each of the two applications has its own virtual memory with its own set of virtual addresses, shown in FIG. 2A as VM-X and VM-Y. Each application also has its own page table 110 that maps its own respective virtual pages into physical pages of the memory. For example, as depicted, application X's virtual page frame number 0 (VPFN 0) is mapped into memory in physical page frame number 1 (PFN 1), and application Y's virtual page frame number 1 (VPFN 1) is mapped into physical page frame number 4 (PFN 4).

The page table 110 is accessed using the virtual page frame number as an offset. To translate a virtual address into a physical address, the virtual address page frame number and the offset within that virtual page is first determined. If a virtual memory address is valid and the table entry is valid, the processor takes the physical page frame number and multiplies it by the page size to get the address of the base of the page in physical memory. Then, the offset is added.

For example, in the case illustrated in FIG. 2A, let's assume a page size of 0x2000. For an address of 0x2194 in VM-Y, the processor would translate that address into an offset of 0x194 into virtual page frame number 1. This virtual page frame number 1 is mapped to physical page frame number 4, which starts at 0x8000 (4x2000). Adding the 0x194 offset to the physical page frame number generates a final physical address of 0x8194. While applications communicate with each other using only virtual addresses and offsets to the virtual address of the base, the present system allows applications to communicate with the kernel using a physical address. As shown, a kernel translation table 210 is used to translate the physical address to OS-level virtual address. The kernel translation table 210 allows translation from physical to virtual address, and may be OS-specific.

According to one embodiment, the memory is pre-allocated and shared with the applications 100, so that the applications 100 and the operating system 200 can both access the physical address table. "Pre-allocation," as used herein, means allocation before any usage of the buffer to transfer data between application/kernel/hardware domains. Moreover, different modules in the operating system 200, wherein all modules share the same virtual address space, convert a physical address to its own OS-level virtual address. The method that each OS uses to translate physical address to virtual address depends on each OS's architecture. For example, Linux OS can translate physical address to virtual address using simple arithmetic for certain range of addresses. When implemented in Linux, the pre-allocated buffers of the present system fall into this range of addresses where simple arithmetic is used to arrive at physical address. Some other OS may have a different mechanism to do this.

An application can calculate the DMA address of an offset by simply adding the offset to DMA address of the start of the buffer. In this manner, an application can directly pass the buffer address to a hardware 300 device without involvement of the operating system 200.

Figure 2B:
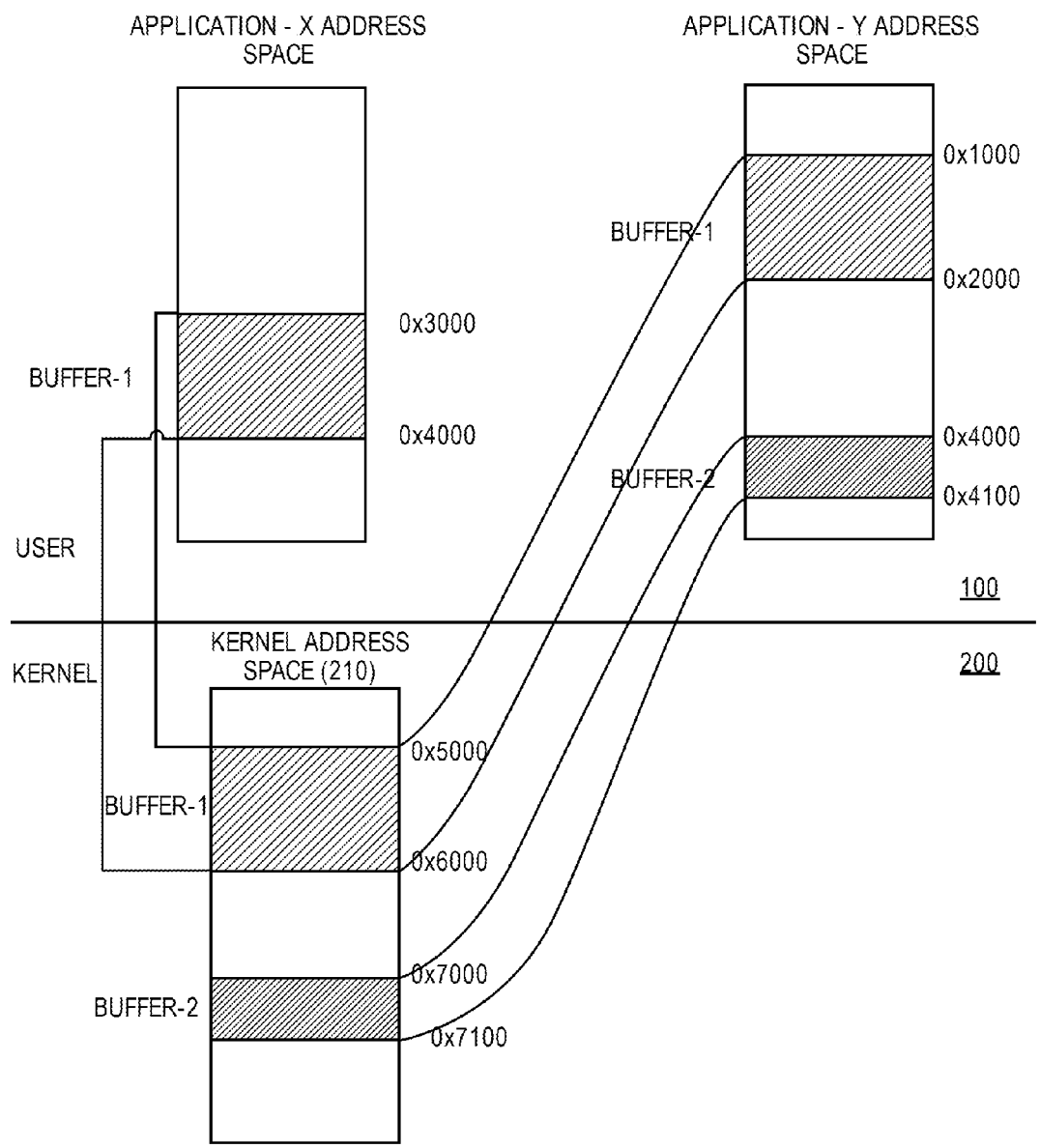
FIG. 2B is another schematic diagram showing the multiple applications in the user space and different virtual addresses in the kernel pointing to a common physical address, enabling the buffer sharing, according to one embodiment.

FIG. 2B is another schematic diagram showing the multiple applications in the user space and different virtual addresses in the kernel pointing to the same physical address, enabling the buffer sharing, according to one embodiment. FIG. 2B shows application X and application Y in the Applications user space 100. In application X, the data that is labeled "Buffer-1" is stored at 0x3000 in application X address space. This data translates to kernel address space 0x5000, for example by using the process depicted in FIG. 2A. The same data (Buffer-1) corresponds to the data at address 0x1000 in Application-Y address space, but both applications X and Y are able to point to the same data using physical address. The data labeled "Buffer-2 is stored at application Y's virtual address 0x4000, which corresponds to kernel address space 0x7000. Due to the fact that kernel modules share the same virtual address space, any OS module can obtain the virtual address using the kernel address shown in FIG. 2B.

Figure 3:
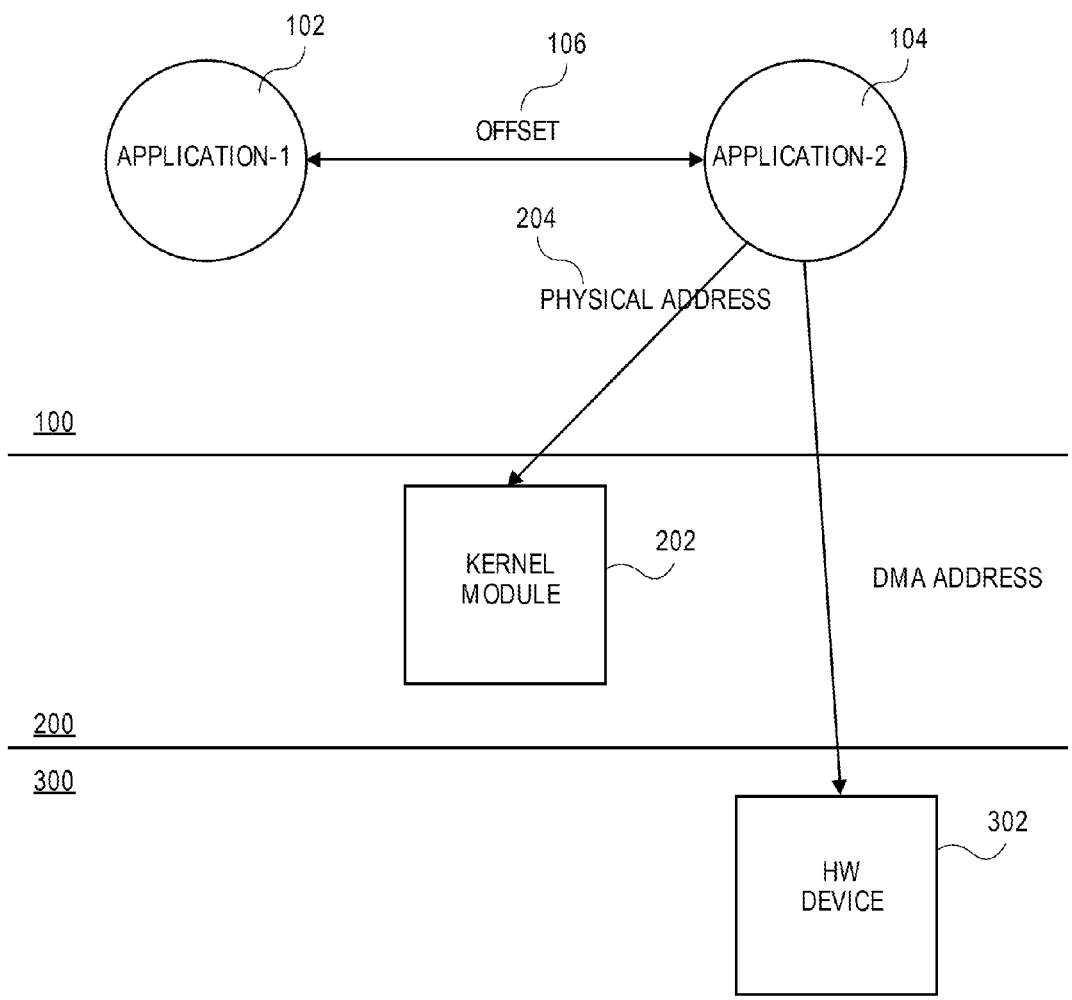
FIG. 3 is a diagram illustrating communication methods between an application, an operating system, and hardware, according to one embodiment.

FIG. 3 is a diagram illustrating communication methods between an application, an operating system, and hardware, according to one embodiment. More specifically, the embodiment of FIG. 3 shows Application-1 102 and Application-2 104 in the user space (Applications 100) communicating with each other by using an offset 106, and Application-2 104 communicating with a kernel module 202 by using physical address 204. The applications (Application-2 104, in this example) can also communicate directly with hardware devices 302 using DMA address generated by using the offset.

According to one embodiment, the present system includes a machine-readable storage having stored thereon a computer program having at least one code section executable by a machine, thereby causing the machine to perform the steps as described above.

According to one embodiment, the present system may be realized in hardware, software, or a combination of hardware and software. While the disclosure focuses on a single-node implementation involving one computer system, it may be adapted for use in a distributed fashion where different elements are spread across several interconnected computer systems. Any kind of computer system or apparatus adapted for carrying out the methods described herein is suited. A typical combination of hardware and software may be a general-purpose computer system with a computer program that, when being loaded and executed, controls the computer system such that it carries out the methods described herein.

The present system may be embedded in a computer program product that includes all the features enabling the implementation of the methods described above, and which, when loaded in a computer system, is able to carry out these methods. "Computer program," in the present context, means any expression, in any language, code, or notation, of a set of instructions intended to cause a system having an information processing capability to perform a particular function either directly or after either or both of the following: conversion to another language, code or notation; reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method by which an operating system communicates with a first application and a second application, the method comprising:

receiving a first physical address from the first application, wherein the first application has a first page table, and the first physical address is determined by mapping virtual pages of the first application into physical pages of a memory using the first page table, and using a first physical page frame number and a first offset to determine the first physical address corresponding to the first application;

the second application communicating with the first application using an application offset, wherein the application offset is applied to the first physical address to determine a second physical address corresponding to the second application; and determining an operating system-level (OS-level) virtual address based on the first physical address to achieve data transfer, wherein the operating system-level (OS-level) virtual address is determined by a kernel translation table based on the first physical address only, and wherein the operating system communicates with the first application and the second application through the first physical address only.

2. The method of claim 1, further comprising:

performing memory allocation and sharing the allocation with the first application and the second application before the first or the second application receives user input.

3. The method of claim 1, wherein there are multiple modules in the operating system, each of the modules having its own OS-level virtual memory, further comprising allowing all of the modules to directly communicate with the first application using the first physical address.

4. A computer-implemented method by which a first application, a second application, an operating system, and hardware in a single node communicate with one another by using a buffer, the method comprising:

the first application converting a first application-level virtual address to a first physical address corresponding to the first application and communicating the first physical address to the operating system;

the first application and the second application communicating with each other using an application offset, wherein the application offset is applied to the first physical address to determine the second physical address corresponding to the second application; and the operating system using the first physical address to determine operating system-level (OS-level) virtual address, wherein the operating system-level (OS-level) virtual address is determined by a kernel translation table based on the first physical address only, and wherein the operating system communicates with the first application and the second application through the first physical address only.

5. The method of claim 4, wherein the first application communicates with the hardware using Direct Memory Access (DMA) address that is calculated using a hardware offset without involvement of the operating system.

6. The method of claim 4, wherein the operating system pre-allocates a memory buffer and provides a way to map physical addresses to applications before receiving user input.

7. The method of claim 4, wherein the first application gets the first physical address and Direct Memory Access (DMA) address of a memory before transferring data between the first application, the second application, the operating system, and the hardware by using the buffer.

8. The method of claim 4, wherein there is a plurality of modules in the operating system, and wherein each of the modules directly communicates with the first application and determines its OS-level virtual address using the first physical address.

9. An apparatus for controlling data transfer, the apparatus comprising a memory mapper that allows a first application to convert a first application-level virtual address to a first physical address corresponding to the first application and communicate the first physical address to an operating system, and allows a second application to communicate with the first application using an application offset, wherein the application offset is applied to the first physical address to determine a second physical address corresponding to the second application, wherein a kernel translation table is used to determine an operating system-level (OS-level) virtual address based on the first physical address only, and wherein the operating system communicates with the first application and the second application through the first physical address only.

10. The apparatus of claim 9, wherein the memory mapper allows the first application to communicate directly with hardware using Direct Memory Access (DMA) address and a hardware offset.

* * * * *